Figure 3A:
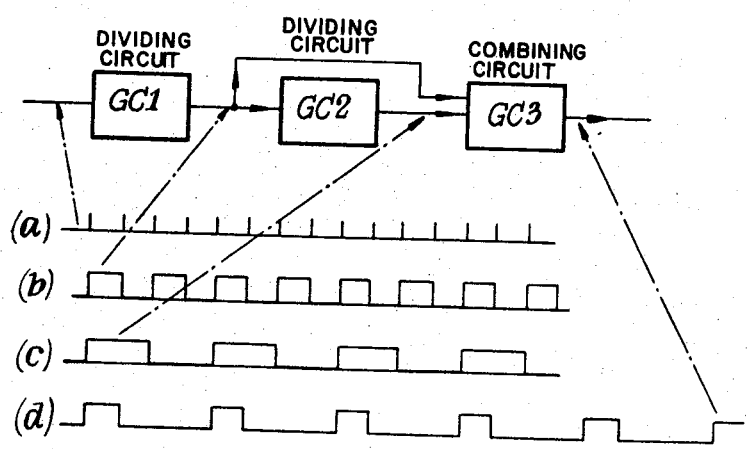

March 10, 1959 G. L. GRISDALE 2,877,416
PHASE MEASURING CIRCUIT ARRANGEMENTS
Filed March 1, 1954
3 Sheets-Sheet 1
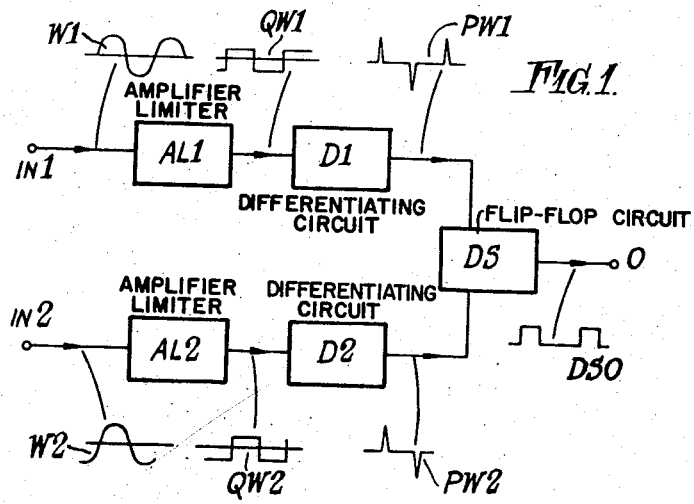
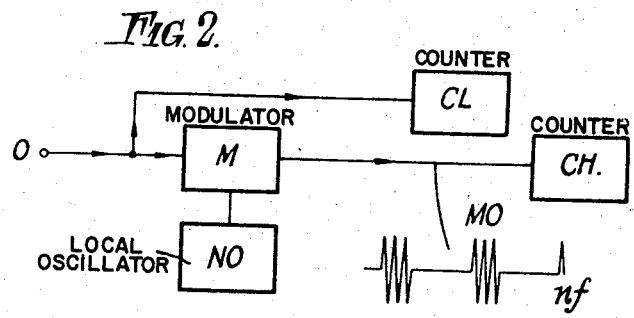
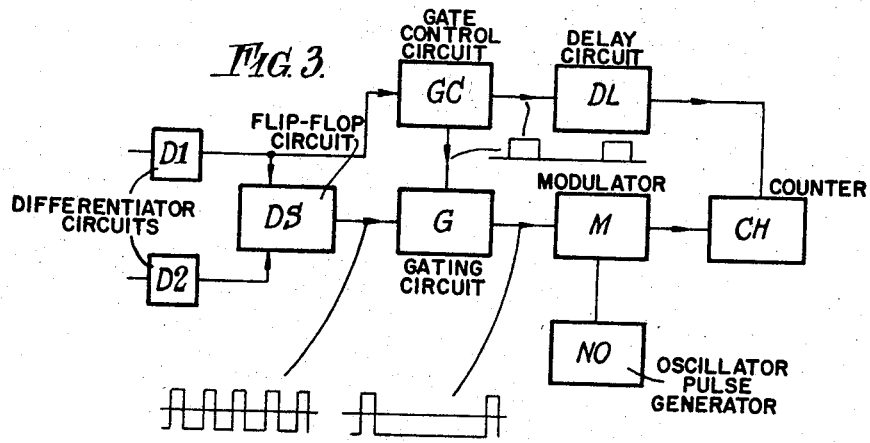
Inventor:
George Lambert Grisdale
By his attorneys:
Baldwin & Wight March 10, 1959 G. L. GRISDALE 2,877,416
PHASE MEASURING CIRCUIT ARRANGEMENTS
Filed March 1, 1954

Inventor:
George Lambert Grisdale
By his attorneys:
Baldwin & Wight

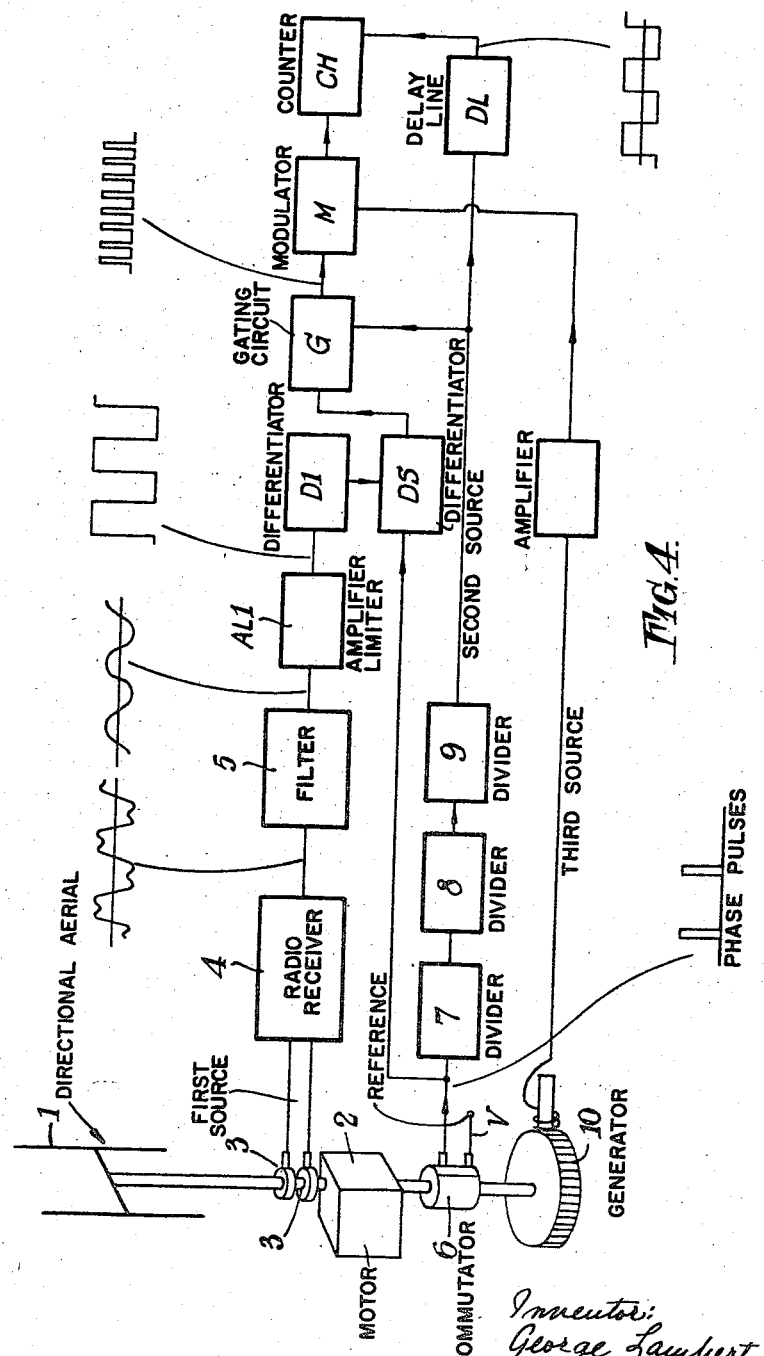

United States Patent Office 2,877,416
Patented Mar. 10, 1959

2,877,416

PHASE MEASURING CIRCUIT ARRANGEMENTS

George Lambert Grisdale, Great Baddow, England, assignor to Marconi's Wireless Telegraph Company Limited, London, England Application March 1, 1954, Serial No. 413,409

Claims priority, application Great Britain March 2, 1953

7 Claims. (Cl. 324—83)

There are many radio and other devices—notably, though not exclusively radio navigation aids—in which it is required to measure the relative phase between two signals and the present invention seeks to provide improved circuit arrangements whereby this may be done.

The invention provides improved phase measuring circuit arrangements of the known kind in which the input waves, the phase between which is to be measured, are used to control a pulse producing circuit adapted to produce pulses each having a length which is a function of the said phase and the said invention is concerned with the provision of improved means for measuring the said length.

The invention is illustrated in and further explained in connection with the accompanying schematic and diagrammatic drawings in which Fig. 1 illustrates the kind of phase measuring circuit arrangement to which the invention relates; Fig. 2 shows an arrangement in accordance with this invention for operation by a circuit such as is shown in Fig. 1; Fig. 3 shows a modification and Fig 3a a detail thereof; and Fig. 4 shows the invention applied to a radio direction finder. Throughout the drawings like parts are indicated by like references.

Referring to Fig. 1 which shows, as far as is necessary for an understanding of the present invention, a typical arrangement of the kind to which the invention relates, the two waves, represented conventionally at W1, W2, whose relative phase is to be ascertained, are applied at IN1, IN2 respectively to the inputs of two amplifier-limiters AL1, AL2 of low phase distortion and which produce substantially rectangular wave outputs as represented as QW1, QW2. These "squared" waves are applied respectively to differentiating circuits D1, D2 which produce therefrom successions of sharp peaks as shown at PW1, PW2 in each case alternately positive and negative going and produced each time the appropriate input wave passes through zero voltage. These peaks are applied as trigger control voltages to a duo-stable circuit arrangement DS, such as a so-called "flip-flop" circuit, having two stable states of equilibrium and which is arranged and connected in well known manner so that, when it receives a trigger peak of a predetermined polarity from differentiator D1 it changes over from one state to the other, while when it receives a trigger peak of the same polarity from differentiator D2 it changes back again. The output at O from circuit DS will therefore consist of a series of substantially rectangular pulses (assumed to be positive going in the representation at DSO) whose repetition frequency is the same as that of each of the two input waves W1, W2, the length of each pulse being proportional to the phase difference between said two input waves. The type of circuit exemplified by Fig. 1 is well known and the present invention has for its object to provide improved reliable and accurate means for utilizing pulse output, of pulse length depending upon phase difference, to indicate said phase difference and/or produce a control action in dependence thereon.

Accordance to this invention a circuit arrangement responsive to phase difference between two waves of the same frequency comprises means for translating said phase difference into substantially rectangular pulses of length dependent upon said difference, means for producing oscillations at a frequency which is a multiple of the first mentioned frequency, means controlled by said rectangular pulses for producing trains of the multiple frequency oscillations, the trains being of length dependent on the lengths of said rectangular pulses, and means for counting the number of oscillations in the trains.

There may be two counters, one connected to count the total number of oscillations in a sequence of trains and the other connected to count the number of rectangular pulses occurring in said sequence, the average number of oscillations in each train being obtained by dividing the reading of one counter by that of the other. This average number of oscillations is a measure of the average phase difference over the period of test.

In another arrangement there is a single counter which is reset after each train.

In yet another single counter arrangement the oscillations in a predetermined number of trains are counted and the counter is reset after said number of trains. Provision is, of course, made for the counter to retain its reading long enough for the operator to read or photograph the indication.

Fig. 2 shows one arrangement in accordance with this invention and suitable for operation by a circuit arrangement as exemplified in Fig. 1. In Fig. 2 NO is a local oscillator which is arranged to produce a frequency which is exactly a desired predetermined number ($n$) of times the frequency of the waves whose phase relation is to be measured. The output from oscillator NO is fed to a modulator M where it is modulated by the operating phase-dependent pulsed output from circuit DS of Fig. 1 (the terminal O in both Figs. 1 and 2 is the same terminal) so that during each negative pulse from DS, a burst of waves of frequency $nf$ (where $f$ is the input frequency at IN1 and IN2) is produced at the output from the modulator. This output, which is represented at MO is fed to any convenient form of counter CH. The pulses appearing at O are fed also to a second counter CL. The number of cycles of frequency $nf$ in each burst fed to the counter CH will be proportional to the pulse length fed in at O and therefore proportional to the original phase difference. The total number of cycles from the modulator is integrated and counted by the counter CH while the number of bursts is given by the counter CL. Therefore the reading of CH divided by that of CL gives the average number of cycles per burst and therefore will be a measure of the original phase difference. If $n$ is chosen at the valve 360, the number of cycles per burst will be the phase difference angle in degrees.

Fig. 3 shows a modification which may be preferred in many cases. In this embodiment only a proportion of the rectangular pulses from the circuit DS—in this example illustrated only every fourth pulse—is used to form bursts of higher frequency pulses. Some other proportion might be used. Again the pulses so used need not occur at regular periodic intervals—for example ten consecutive bursts might be so used and counted, followed by a gap in which the counter is reset to zero, followed by ten further counted bursts, and so on.

Referring to Fig. 3 a gating circuit arrangement G is interposed between the flip-flop circuit DS and the modulator M. This gate of the circuit arrangement G is opened and closed by a gate control circuit GC in such a way that only a chosen proportion of the rectangular pulses from the circuit DS are passed to the modulator M. In the chosen example the proportion is one in four.

The gate control circuit GC is actuated from the differentiator D1 so that the gate opens and closes at the instant of commencement of a rectangular pulse. The control circuit GC includes means for eliminating peaks of one polarity (in the example being described, those of negative polarity) and a suitable frequency dividing and shaping circuit an example of which is shown in Fig. 3 together with typical waveforms.

Referring to Fig. 3a, the positive peaks separated from the output of differentiator D1 and represented in line (a) are applied to a scale-of-two dividing circuit GC1 of known form and adapted to produce a sequence of pulses as shown in line (b). These pulses are applied to a second, similar scale-of-two dividing circuit GC2 whose output is as represented in line (c). The outputs represented in lines (b) and (c) are combined in a combining circuit GC3 of known form adapted to produce an output as represented in line (d) consisting of pulses of one quarter the peak frequency of line (a). These quarter frequency pulses (line (d)) are used to control the gate G (Fig. 3) to open the same only during the occurrence of the pulses of line (d) of Fig. 3a and are also fed through a delay line or circuit DL to a zero reset circuit of the counter CH to reset the same to zero. The gated pulses—one in four of those from circuit DS—are fed to modulator M associated with an oscillator pulse generator NO operating at $n$ times the original frequency of the waves whose phase relation is to be measured. The number of cycles in each burst will be a measure of the phase relation and is counted by the counter CH which is cleared i. e. reset to zero through the delay line after each count.

Fig. 4 shows the invention applied to a radio direction finder—an important but by no means exclusive application of the invention.

Referring to Fig. 4, the directional aerial system is shown, for the sake of simplicity, as consisting of a directional aerial 1 rotated continuously by a motor 2 at a suitable speed which will be assumed to be 25 revolutions per second. Obviously a fixed aerial and rotating radiogoniometer might replace the rotating aerial shown. Received signals are fed, through slip rings and brushes 3 to a radio receiver 4 the output from which will be a 25 C./S. modulation, as indicated conventionally, with a wave form dependent on the aerial polar diagram and a phase dependent on the incoming signal direction. If required an omnidirectional aerial (not shown) may also be provided and its output combined with that of the directional aerial system to produce a suitable wave form free of sense ambiguity as is well known in radio direction finders of the general nature of that now being described. The receiver output is fed to a 25 C./S. band pass filter 5 which extracts the fundamental component of the wave form to produce a 25 C./S. wave as indicated which is fed to a limiter amplifier AL1. The output from AL1, consisting of a 25 C./S. squared wave of phase dependent on the incoming signal direction is differentiated by a differentiator D1, alternate peaks from which (e. g. the positive peaks) trigger a flip-flop circuit DS as already described in connection with Figs. 1, 2 and 3.

On the shaft of the motor 2 is a commutator 6 which produces from a potential source (not shown) connected at V, 25 C./S. reference phase pulses as indicated and which provide the second triggering input to the flip-flop circuit DS. These reference phase pulses are also fed to a cascade of three scale-of-two dividers 7, 8, 9 the output from the last of which will consist of a 3⅛ C./S. square wave which is fed to control a gating circuit G interposed between the flip-flop circuit DS and a modulator M. Thus the gate will open for alternate half-cycles of the 3⅛ C./S. square wave, each of these cycles permitting 8 rectangular 25 C./S. waves to pass from the flip-flop circuit DS to the modulator M.

Also on the shaft of the motor 2 is a phonic wheel generator 10 producing an output of $n$ times 25 C./S. If the wheel has 45 teeth ($n$ is 45) the phonic wheel output will be 1125 C./S. and this, after amplifying and shaping into pulses at an amplifier pulse former, forms the oscillatory input to the modulator M. With this arrangement there will be eight bursts of phonic wheel frequency pulses produced from the modulator approximately three times per second and the length of each burst will be a measure of the phase difference between the wave form from the filter 5 and the reference phase from the commutator 6. The output pulses from the last scale-of-two divider 9 are also fed through a suitable delay line DL to reset to zero a counter CH which counts the output from the modulator M. Since the maximum count between successive resets is 8 times 45=360 the counter will read relative phase directly in degrees.

Obviously a voltage generator or other means could replace the commutator shown but the illustrated arrangement is preferred because of its simplicity and economy as regards the amplifiers and limiters necessary. Also other forms of generator could be used in place of the phonic wheel generator shown.

If a close reading of phase is required this may be achieved by increasing the phonic wheel frequency or by increasing the length of the gating element applied to the gating circuit G.

The invention lends itself to remote indication of relative phase, for either the rectangular wave form or the trains of pulses from the modulator may be transmitted over lines or radio links to a remote point where the counting may be effected.

The invention may also be used to obtain average phase difference over a length of time for, so long as the counting circuits will indicate a large enough number, there is no (other) limit to the time of operation before a reset.

I claim:

1. A phase responsive circuit arrangement comprising in combination, a first source of oscillations of variable phase, a second source of oscillations of the same frequency as the oscillations of said first source and of fixed phase, a third source of oscillations of a frequency higher than the frequency of the oscillations of said first two named sources, the frequency of said third source being selectively fixed in predetermined numerical relationship to the frequencies of said first and second source, means for simultaneously controlling the coordination of the frequencies developed by all of said sources, a rectangular pulse wave generator jointly controlled by said first two named sources, means for applying oscillations from one of said first two named sources to said pulse wave generator to cause the same to commence production of a pulse at a predetermined point in each oscillation from said first source, means for applying oscillations from the other of said first two named sources to said pulse wave generator to cause the same to cease production of said pulse at the corresponding point in each oscillation from said other source, whereby said generator produces pulses of length determined by the phase relation between the oscillations from said first two named sources, at least one oscillation counter, a channel extending between said third source of oscillations and said counter for applying oscillations from said third source to said counter to be counted thereby, and means, interposed in said channel and controlled by the pulses from said generator, for closing said channel at one end of a pulse from said pulse wave generator and opening said channel at the other end of said pulse.

2. A phase responsive circuit arrangement as set forth in claim 1, wherein said counter is resettable and is adapted to count the oscillations of the third source occurring in the interval between an opening of said channel and the next subsequent closing thereof.

3. A phase responsive circuit arrangement as set forth in claim 1 which includes a second counter adapted to count the pulses from said pulse wave generator and means for applying the said pulses to said second counter.

4. A phase responsive circuit arrangement as set forth in claim 1 wherein said counter is resettable and is adapted to count the oscillations of the third source occurring in the interval between an opening of said channel and the next subsequent closing thereof and wherein said pulse wave generator controls said interposed means through a circuit including a gate adapted to pass only certain ones of the pulses from said pulse wave generator.

5. A phase responsive circuit arrangement as set forth in claim 1 wherein said counter is resettable and is adapted to count the oscillations of the third source occurring in the interval between an opening of said channel and the next subsequent closing thereof and wherein said pulse wave generator controls said interposed means through a circuit including a gate adapted to pass only certain ones of the pulses from said pulse wave generator, said gate being opened and closed by control pulses derived from the second source of oscillations through means including a frequency divider whereby said control pulses are at a frequency which is an integral sub-multiple of that of said second source.

6. A phase responsive circuit as set forth in claim 1 wherein said first source of oscillations is constituted by a directional receiving aerial of continuously rotatable directivity and wherein said means for simultaneously controlling the coordination of the frequencies developed by all of said sources is a motor which varies said directivity at the frequency of said first source, and wherein said second source of oscillations is a switch device connected to a source of potential, and wherein said third source is an alternating current generator, said switch device and said alternating current generator being also driven by said motor which varies said directivity.

7. A phase responsive circuit as set forth in claim 1 wherein said first source of oscillations is constituted by a directional receiving aerial of continuously rotatable directivity and wherein said means for simultaneously controlling the coordination of the frequencies developed by all of said sources is a motor which varies said directivity at the frequency of said first source, and wherein said second source of oscillations is a switch device connected to a source of potential, and wherein said third source is an alternating current generator, said switch device and said alternating current generator being also driven by said motor which varies the directivity of said directional receiving aerial, the output from said receiving aerial being received and detected by a radio receiver connected to supply its output to said pulse wave generator through a band pass filter adapted to pass a frequency equal to the frequency of said first source of oscillations.

References Cited in the file of this patent

UNITED STATES PATENTS

| | | |
|---|---|---|
| 2,332,300 | Cook | Oct. 19, 1943 |
| 2,370,692 | Shepherd | Mar. 6, 1945 |
| 2,412,111 | Wilson | Dec. 3, 1946 |
| 2,414,479 | Miller | Jan. 21, 1947 |
| 2,447,728 | Bartholy | Aug. 24, 1948 |
| 2,513,477 | Gubin | July 4, 1950 |
| 2,721,996 | Roemer | Oct. 25, 1955 |
| 2,752,593 | Downs | June 26, 1956 |

FOREIGN PATENTS

| | | |
|---|---|---|
| 553,090 | Germany | June 24, 1934 |
| 703,189 | Great Britain | Jan. 27, 1954 |

OTHER REFERENCES

Miller: Abstract of application Serial No. 715,443, published July 19, 1949, 624 O. G. 929.